HALL EFFECT MULTIPLYING ARRANGEMENT

Filed Oct. 22, 1964 2 Sheets-Sheet 1

United States Patent Office 3,370,241
Patented Feb. 20, 1968

3,370,241

HALL EFFECT MULTIPLYING ARRANGEMENT

Wolja Saraga, Orpington, England, assignor to Associated Electrical Industries Limited, London, England, a British company

Filed Oct. 22, 1964, Ser. No. 405,897
Claims priority, application Great Britain, Oct. 25, 1963, 42,228/63
4 Claims. (Cl. 329—200)

ABSTRACT OF THE DISCLOSURE

Hall effect arrangements in which two electrode pairs of a symmetrical Hall plate are utilized as common input/output electrodes, thereby enabling two multiplying operations to be performed independently but simultaneously: the two multiplying operations can be utilized for modulation and demodulation purposes.

This invention relates to Hall effect devices, that is devices including an element exhibiting the well-known Hall effect and adapted for use in such manner as to utilize that effect.

A conventional Hall multiplier, which is a particular form of Hall effect device, is illustrated in FIG. 1 of the accompanying drawings and comprises a rectangular Hall plate P having current input electrodes *ip* along the shorter sides of the Hall plate P, and voltage output electrodes *op* located at a central position on the longer sides of the Hall plate P. A coil MC is provided for producing a magnetic field to which the Hall plate P is subjected. In operation, the vector product feature of the Hall effect causes a Hall output voltage to be developed in a direction at right angles both to input current and to input magnetic field, this voltage being proportional to the sine of the angle $\alpha$ between the directions of current and magnetic field: by making $\alpha=90°$ so that $\sin \alpha=1$ and by providing the voltage output terminals *op* in the direction perpendicular to the two input directions maximum Hall output voltage is obtained. However, in a Hall multiplier of this type, the various directions referred to are fixed so that the multiplier acts as an ordinary numerical multiplier: in other words its Hall output voltage is proportional to the numerical product of the input current applied to the Hall plate and to input current producing the magnetic field.

According to the present invention there is provided a Hall effect arrangement comprising: a Hall device which can function as a multiplier and which comprises; a Hall plate which is substantially symmetrical along orthogonal axes, two electrode pairs provided on said Hall plate on respective ones of said axes, and magnetic means for subjecting the Hall plate to a magnetic field; said Hall device being arranged to perform independently, but simultaneously, two operations of the kind $y=A\times C$ and $z=B\times C$, where A and B are values representable by electrical inputs, C is a value representable by a magnetic field and $y$ and $z$ are values representable by electrical outputs, by said arrangement further comprising; means for energizing said magnetic means for subjecting said Hall plate to a magnetic field representing the value C; input means connected to said two electrode pairs for producing in said Hall plate in mutually perpendicular directions two input currents representing the values A and B respectively; and output means also connected to said two electrode pairs for extracting from the Hall plate in mutually perpendicular directions two discrete Hall output voltages representing the values $y$ and $z$.

In the special case where A and B are component values (in space) of a vector $V=iA$ and $jB$, the Hall device of an arrangement conforming to the invention can be used to produce the vector product:

$$[(kC)\wedge V]=i(-BC)+j(AC)$$

The device can therefore be used for obtaining the vector product of an oscillating vector C having an arbitrary value $k$ which is applied as a magnetic field and a rotating electric current vector which is produced in the Hall plate by applying to the plate electrodes quadrature phased input currents representing the values A and B.

In order that the invention may be more fully understood, reference will now be made by way of example to the remaining FIGS. 2 to 7 of the accompanying drawings, in which.

Figures 1, 2, 3:
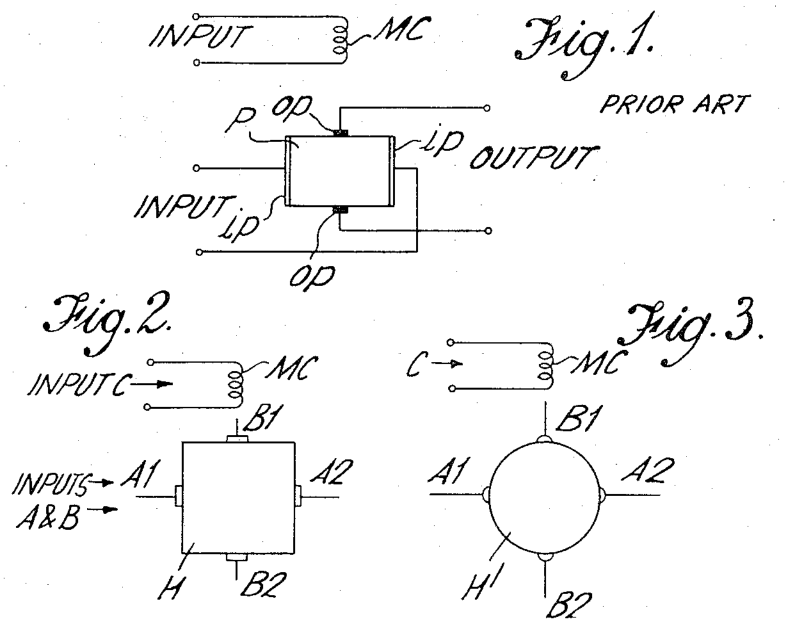
Fig. 1. PRIOR ART Fig. 2. Fig. 3.
FIGS. 2 and 3 illustrate diagrammatically alternative forms of Hall effect device according to the invention.

Referring to the drawings, the Hall effect device shown in FIG. 2 comprises a symmetrical, square Hall plate H having two pairs of input/output electrodes A1, A2 and B1, B2 located on opposite sides thereof (or equivalently at diagonally opposite corners), together with a magnetizing coil MC. FIG. 3 shows an equivalent Hall device in which the symmetrical Hall plate H' is circular instead of square. In each case, the two pairs of electrodes A1, A2 and B1, B2 serve both as input current electrodes and as Hall output voltage electrodes. This means, of course, that the device can only be used where the input and output signals are sufficiently different in character to be easily separable. In many modulation and demodulation arrangements, input and output frequencies differ widely and can therefore be easily separated so that the Hall plate device has application as a multiplier (modulator or demodulator) in such arrangements as will be considered later in the specification.

In certain of such multiplier applications, as will be described, totally unrelated input current signals represent the values A and B of the foregoing equations so that the two products $A\times C$ and $B\times C$ as considered in these equations and as produced simultaneously by the device in its basic function are quite independent from each other. Therefore, the electrode arrangement of the Hall plates shown in FIGS. 2 and 3 cannot be changed and a distinction between which of the electrode pairs A1, A2 and B1, B2 are input electrodes and which are output electrodes is not possible.

However, in certain other of the multiplier applications, the input currents representing the values A and B are related, being phase-displaced versions of the same signal, and serve to produce in the Hall plate a rotating electric current vector. In this instance, the purpose of the device, within its basic function, is to produce a Hall voltage output vector representing the product of this electric current vector and an oscillating vector applied as a magnetic field representing the value C. From this Hall voltage output vector can be obtained two discrete Hall output voltages which represent the values $y$ and $z$ and which are identical except for their phase relationship.

Figure 4:
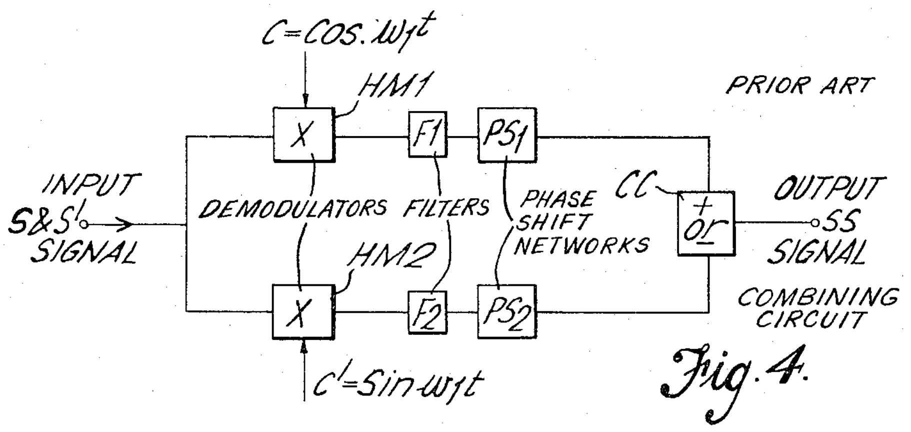
FIG. 4 illustrates diagrammatically a known demodulation arrangement.

Turning now to the remaining figures of the drawings which illustrate some possible applications of the Hall effect device, the known demodulation arrangement shown in FIG. 4 is of the out-phasing type in which a received wanted sideband signal S together with an unwanted sideband signal S' is applied jointly to two individual multipliers HM1 and HM2, acting as demodulators, to which quadrature phase versions C and C' of a channel carrier signal are also applied respectively. The output signals from the demodulators HM1 and HM2 are applied respectively to filters F1 and F2 which pass only the low frequency components of the signals and the resultant signals composed of these low frequency components are phase-shifted by means of two 90° phase-shift networks PS1 and PS2. The phase-shifted signals are then additively or subtractively combined in a combining circuit CC so that unwanted frequency components due to S' in the two signals are suppressed while wanted frequency components due to S are reinforced and constitute a resultant output signal SS from the demodulation arrangement.

Figure 5:
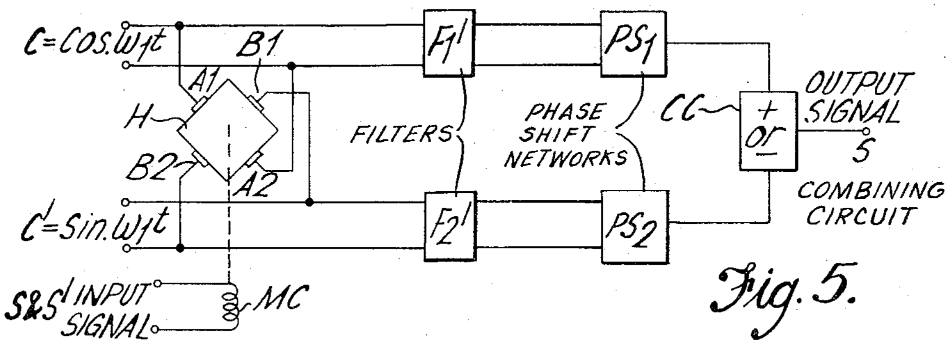
FIG. 5 illustrates an equivalent demodulation arrangement embodying a Hall effect device according to the invention.

In the equivalent demodulation arrangement shown in FIG. 5, which employs a Hall effect device according to the invention as shown in FIG. 2 (or equivalently FIG. 3), quadrature-phase versions C and C' of the carrier signal are applied respectively to the two electrode pairs A1, A2 and B1, B2 of the Hall plate H to produce in the plate a rotating electric current vector, and the received sideband signal S and S' are used to energize the coil MC of the device to produce an oscillating magnetic field to which the Hall plate H is subjected. As aforesaid, the two electrode pairs A1, A2 and B1, B2 serve both as input and as output electrodes and are therefore connected to respective filters F1' and F2' which pass the two phase-displaced versions of the resultant demodulated signal produced by the Hall effect device, but suppress the carrier signals C and C' and, as in FIG. 4, the high frequency components arising from demodulation. Thereafter phase-shifting of the two versions of the resultant signal by means of phase-shift networks PS1 and PS2, followed by additive or subtractive combining thereof in a combining circuit CC produces an output signal SS consisting of the wanted frequency components.

Figure 6:
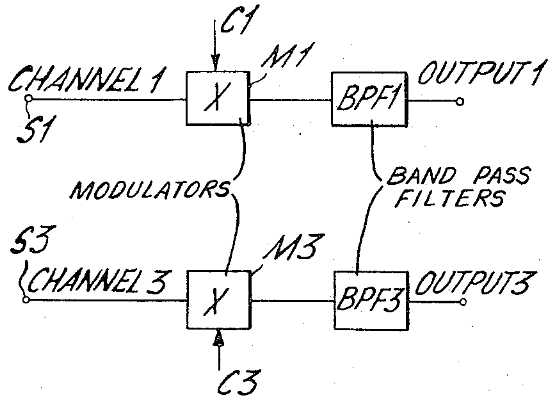
Fig. 6. PRIOR ART
FIGS. 6 and 7 show, respectively, a known modulation arrangement and an equivalent modulation arrangement embodying a Hall effect device according to the invention.
Figure 7:
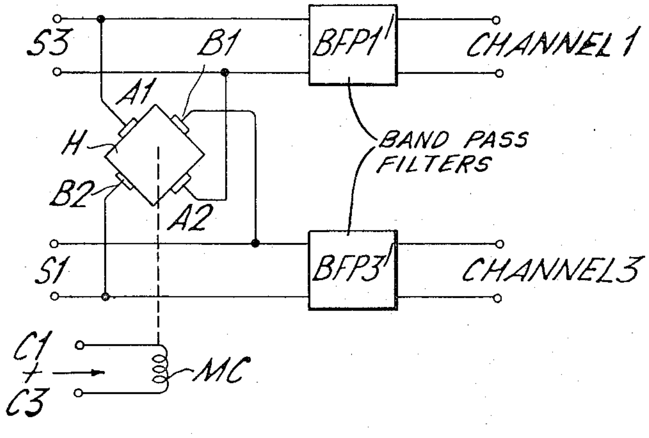

The known modulation arrangement illustrated in FIG. 6 employs individual multipliers (modulators) M1, M3, etc., for each channel and individual band-pass filters BPF1, BPF3, etc., for the suppression of the unwanted sideband in the double sideband signal produced in the channel. In operation, input signals S1, S3, etc., to be modulated are accepted by the relevant channel, and within each channel the relevant input signal is modulated in the modulator thereof with the channel carrier C1, C3, etc. After the suppression of the unwanted sideband in the resulting double sideband signal by means of the band-pass filter, the remaining single sideband is transmitted. By using a Hall plate device according to the invention as shown in FIG. 2 (or equivalently FIG. 3) in respect of non-adjacent channels, such device can serve as a modulator for two channels, as indicated in FIG. 7. In this figure the input signals S1, S3, etc., to be modulated are accepted by the relevant channel, the signal in one channel being then fed to one electrode pair A1, A2 of the Hall plate H, and the signal in the other channel being fed to the other electrode pair B1, B2. The two channel carriers C1 and C3 are applied in common, i.e., combined additively, to the coil MC of the device to produce respective oscillating magnetic fields to which the Hall plate H is subjected. As a result, there is produced simultaneously at each of the electrode pairs A1, A2 and B1, B2 two double sideband signals, namely signals S1C1 and S1C3 at one electrode pair and S3C1 and S3C3 at the other electrode pair. As regards channel 1 the signal required to be transmitted therefrom is the lower or upper sideband contained in the double sideband signal S1C1, while the signal required to be transmitted by channel 3 is the lower or upper sideband contained in the double sideband signal S3C3. This selection is achieved by band-pass filters BPF1' and BPF3' which also suppress the input signal interference.

In the case of a modulation circuit arrangement effecting double sideband generation, adjacent channels may share the Hall plate device, serving as a common modulator, because the frequencies of the two channel carriers would be sufficiently far apart for the required double sideband signals not to overlap.

What I claim is:

1. A Hall effect arrangement comprising:

(a) a Hall device which can function as a multiplier and which comprises:

(i) a Hall plate which is substantially symmetrical along orthogonal axes, (ii) two electrode pairs provided on said Hall plate on respective ones of said axes, and (iii) magnetic means for subjecting the Hall plate to a magnetic field;

said Hall device being arranged to perform independently, but simultaneously, two operations of the kind $y=A\times C$ and $z=B\times C$, where A and B are values representable by electrical inputs, C is a value representable by a magnetic field and $y$ and $z$ are values representable by electrical outputs, by said arrangement further comprising;

(b) means for energizing said magnetic means for subjecting said Hall plate to a magnetic field representing the value C;

(c) input means connected to said two electrode pairs for producing in said Hall plate in mutually perpendicular directions two input currents representing the values A and B respectively; and (d) output means also connected to said two electrode pairs for extracting from the Hall plate in mutually perpendicular directions two discrete Hall output voltages representing the values $y$ and $z$.

2. A Hall effect arrangement according to claim 1, wherein said Hall device is operable to produce the vector product of an oscillating vector suitable for application as a magnetic field representing the value C and a rotating electric current vector producible in the Hall plate of the device by the application to the plate electrodes of quadrature-phased input currents representing the values A and B, said arrangement including means for applying said magnetic field and quadrature-phased input currents to the Hall device and means for obtaining from a resulting Hall voltage vector which is produced in said Hall plate and constitutes said vector products, two discrete Hall output voltages representing the values $y$ and $z$ and present at the plate electrodes.

3. A Hall effect arrangement according to claim 1, embodied in a demodulation arrangement of the out-phasing type comprising demodulation means, phase-shifting means for effecting appropriate phase relationship of wanted and unwanted frequency components contained in two phased-displaced versions of a demodulated signal as produced by said demodulator means, and combining means for effecting additive or subtractive combination of these signal versions so as to cancel the unwanted frequency components and reinforce the wanted frequency components, wherein said Hall device of the Hall effect arrangement constitutes said demodulation means and has its two electrode pairs connected to receive respectively quadrature-phased versions of a channel carrier signal and its magnetic means connected to receive a sideband signal to be demodulated, and wherein filter means are connected between said two electrode pairs and said phase-shifting means, the Hall device being operable in response to the carrier signal versions and the sideband signal to function as a multiplier to produce at its two electrode pairs respective resultant signals containing said wanted and unwanted frequency components.

4. A Hall effect arrangement according to claim 1, embodied in a multi-channel modulation arrangement in which input signals to be modulated are accepted by the relevant channel and within each channel the relevant input signal is modulated with a channel carrier signal to produce a double sideband signal, wherein said Hall device of the Hall effect arrangement constitutes a common modulator in respect of two non-adjacent channels of the modulation arrangement and has its two electrode pairs connected respectively to receive the two input signals to be modulated within the two channels and its magnetic means connected to receive in common the two carrier signals of the two channels, respective band-pass filters for the two channels being connected to said two electrode pairs which also serve as output electrodes, and the Hall device being operable in response to said two input signals and said two carrier signals to function as a multiplier to produce at each of its two electrode pairs two double sideband signals of which one is the double sideband signal for the relevant channel which can be passed fully on input by the channel band-pass filter and the other is an unwanted double sideband signal which the channel band-pass filter rejects.

References Cited

UNITED STATES PATENTS

| | | | |
|---|---|---|---|
| 3,050,698 | 8/1962 | Brass | 332—51 |
| 3,097,296 | 7/1963 | Chasmar et al. | 329—200 X |
| 3,221,273 | 11/1965 | Livingston | 332—51 |

ALFRED L. BRODY, *Primary Examiner.*